United States Patent [19]

Shaver

[11] Patent Number: 4,561,092
[45] Date of Patent: Dec. 24, 1985

[54] METHOD AND APPARATUS FOR DATA COMMUNICATIONS OVER LOCAL AREA AND SMALL AREA NETWORKS

[75] Inventor: Michael O. Shaver, Killeen, Tex.

[73] Assignee: The BDM Corporation, McLean, Va.

[21] Appl. No.: 494,540

[22] Filed: May 13, 1983

[51] Int. Cl.[4] ............................................... H04J 6/00
[52] U.S. Cl. .................................. 370/89; 340/825.05; 340/825.5
[58] Field of Search ...................... 370/89, 85, 94, 95, 370/87, 88; 340/825.05, 825.5, 825.51

[56] References Cited

U.S. PATENT DOCUMENTS 3,863,220 12/1984 Osawa et al. .......................... 370/89
4,337,465 6/1982 Spracklen et al. ..................... 370/85

OTHER PUBLICATIONS

Goldberg et al., "Small-Area Networks Fit Jobs Too Small For Local Nets", *Electronics,* Nov. 3, 1982, pp. 119–122.

*Primary Examiner*—Douglas W. Olms
*Attorney, Agent, or Firm*—Lahive & Cockfield

[57] ABSTRACT

A data communications network has a transmission data channel wherein a plurality of network nodes are connected thereto according to a loop topology. Each node has a transceiver, a control switch for operating the node in either a pass through state, wherein received data from an upstream side of the channel is transmitted to the downstream side of the channel, or in a source transmit state wherein the node transmits its own message data to the downstream side of the channel while monitoring the upstream side. In the source transmit state, the node matches the received data with its transmitted data and truncates its transmission upon recognition of an error in the received message. In this manner, there is no requirement that the destination node acknowledge receipt of the data since the data received by the transmitting node is the most corrupted form of the data. The node further has a bus contention protocol wherein the node "backs off" from transmitting on the channel for a specific time-out duration. The time-out duration is varied depending upon the priority of the received message vis-a-vis the priority of the message being transmitted by the node. A node associated with a message having a higher priority "backs off" for a shorter time duration period. The time duration is determined by and at the node and can be programmed into a programmable, retriggerable, one-shot timing element.

12 Claims, 5 Drawing Figures

METHOD AND APPARATUS FOR DATA COMMUNICATIONS OVER LOCAL AREA AND SMALL AREA NETWORKS

BACKGROUND OF THE INVENTION

The invention relates generally to digital communication systems and in particular to local area network hardward protocols for digital communications.

As digital communication networks become more complex and sophisticated, many communication protocols have evolved. For example, in a token passing methodology, a node must wait until receipt and thus possession of the token or marker to transmit its data. Similarly, with respect to a polling protocol, each node is "time-slotted" access periods and must wait until it is polled. Furthermore, there exist what are called carrier wave crash detectors wherein a node attempts to reacquire the bus randomly. In each case bus access is allotted to the various nodes without regard to the relative urgency or priority of the messages.

With regard to all of these methods, message error checking is performed at the destination node. This requires extensive data error checking and correction transmission overhead. In addition, typically, the destination node requires circuitry for acknowledging receipt of the correct (or correctable) message.

Thus, existing network protocols, while operating reliably, tend to complicate the hardward associated with each node and/or require substantial (in relative terms) delay with respect to high priority or urgent messages.

It is therefore a primary object of the invention to maintain high communications reliability on a local area network while reducing the hardward complexity associated with network protocol. Other objects of the invention are a distributed access for each network node depending upon the priority or urgency of the message, and a correspondingly lower overhead cost per node with respect to data throughput and hardware.

SUMMARY OF THE INVENTION

The invention thus relates to a local area data communications network having a transmission data channel with a plurality of network nodes connected thereto according to a loop topology. The invention features connection apparatus at each network node having a transceiver with an upstream receiver circuitry for receiving message data on an upstream side of said data channel and a downstream transmitter for applying message data to the downstream side of the data channel at the network node. The invention further features switching circuitry operable in a pass through state for effectively connecting the upstream receiver to the downstream transmitter whereby the message data received on the upstream side of the data channel is applied to the downstream side of the data channel. The switching circuitry thus operates the node as a repeater in the pass through state. The switching circuitry further operates in a source transmit state for connecting a local source of message data to the downstream transmitter for applying local message data to the downstream side of the data channel.

The apparatus further features control circuitry for controlling the operating state of the switching circuitry. The control circuitry is responsive to received message data when the switching circuitry is in the pass through state for maintaining the switching circuitry in the pass through state. The control circuitry is also responsive to the local source for actuating the switching circuitry from the pass through state to the local source transmit state when no message data is being received from the upstream side of the channel. Finally, the control circuitry has further elements for comparing upstream received message data with the message data transmitted downstream by the node (when the switching circuitry is in the local transmit state) and for terminating local transmission and thereafter actuating the switching circuitry to the pass through state if the received data is not identical (although somewhat time delayed) to the transmitted data.

In another aspect of the invention, the control circuitry further features a timing device for producing a time out signal, and circuitry responsive to received message data for initiating, at each received data, the timing of a selected one of at least two time out durations. The time-out signal represents the end of the selected duration. Further elements of the control circuitry are responsive to the timing device for inhibiting transmission of local message data during the selected duration.

The apparatus further features circuitry for determining the occurrence of a bus contention situation, and priority determining circuitry, responsive to the occurrence of a bus contention situation, for selecting a short duration time out signal from the timing device when the node has a higher priority than the contending network node upstream thereof, and for selecting a long duration time out signal from the timing device when the node has a lower priority than the contending network node upstream thereof.

In a preferred embodiment of the invention, the timing device is a retriggerable, programmable, digital one shot circuit which is responsive to the priority circuitry for providing a time out output signal at the end of the selected pulse duration. According to the preferred embodiment, there is further featured circuitry for terminating a message by forcing an uncorrectable parity error in the message, thus marking the message as a "bad message". The message data will then be ignored at the intended destination node.

The invention also relates to the method for communicating between a plurality of network nodes sequentially connected along a communications data channel, the channel having a loop data path communications structure. The method features, at each network node, the steps of receiving message data on the upstream side of the data channel; transmitting message data on the downstream side of the data channel from a selected source; selecting the source by switching between the upstream side of the data channel and a network node local source of message data, the upstream side of the data channel providing the channel message data and the network node local source providing local message data to the channel; and controlling the source selected for transmission downstream by (a) responding to received message data when the upstream side of the data channel is selected for maintaining the upstream data channel as the selected source, (b) selecting the local source of message data when the network node is ready to transmit data and no message data is being received upstream of the network node at the time of selection, (c) terminating local transmission in response to a mismatch between the transmitted and received data thereby indicating an error in the transmitted data as it would be received at the destination node, and (d) selecting a pass through mode of operation if the local transmission is terminated as a result of a mismatch between the upstream received message data and the transmitted local source message data.

SUMMARY OF THE DRAWINGS

Other objects, features, and advantages of the invention will appear from the following description taken together with the drawings in which.

DESCRIPTION OF PREFERRED PARTICULAR EMBODIMENTS

Figure 1:
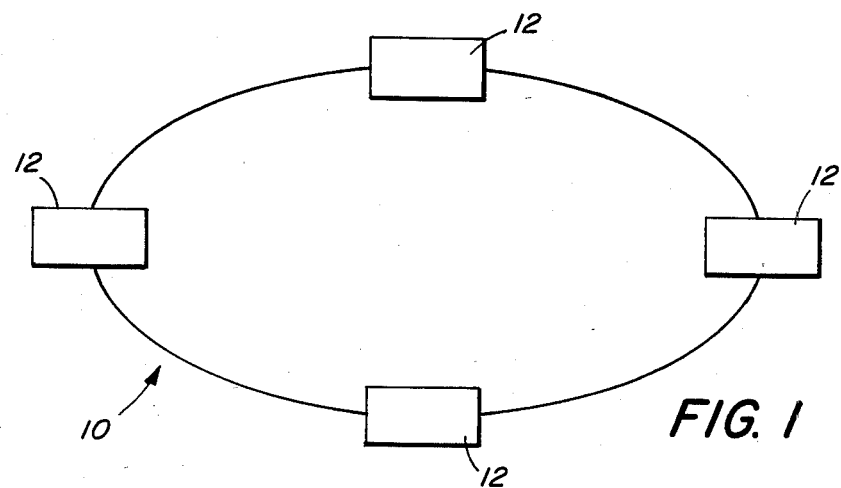
FIG. 1 is a schematic block diagram of a network having a loop topology in which the invention can be employed.

Referring to FIG. 1, the invention relates to an equal resource acquisition ring bus 10 which is applicable to local area networks as well as small area networks. The primary characteristic of the network, required in accordance with the invention, is a loop structure or topology for providing a continuous path from the downstream side or transmit side of a node 12 to the upstream or receive side of the node, the path passing through each other node of the network. Thus, referring to FIG. 1, a plurality of nodes 12 connect in a point to point fashion to form a ring bus 12 having a loop topology. The nodes 12 are connected to each other, for example, by twisted wire pairs. In other embodiments, the nodes can be connected in a loop back, star, or other configuration, by, for example, coaxial cable, fiber optics, or another communications media. The operation of the bus access "protocol", in accordance with the invention, is transparent to the particular media connection or the specific loop topological configuration of the network. Power can be provided to the nodes by lines 13 (FIGS. 2 and 3).

Figure 2:
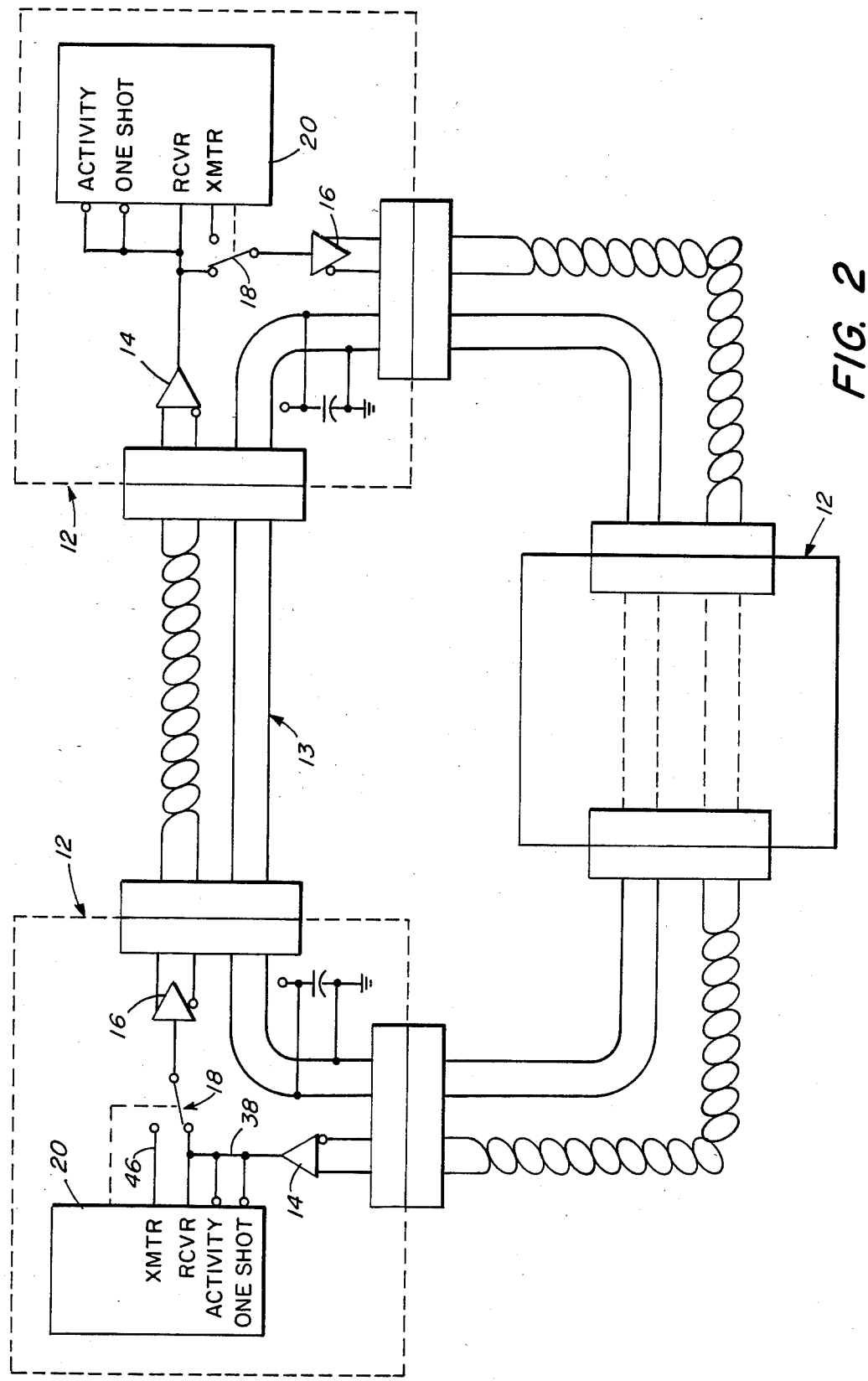
FIG. 2 is a more detailed schematic block diagram schematic showing a single loop line ring bus employing the invention.
Figure 3:
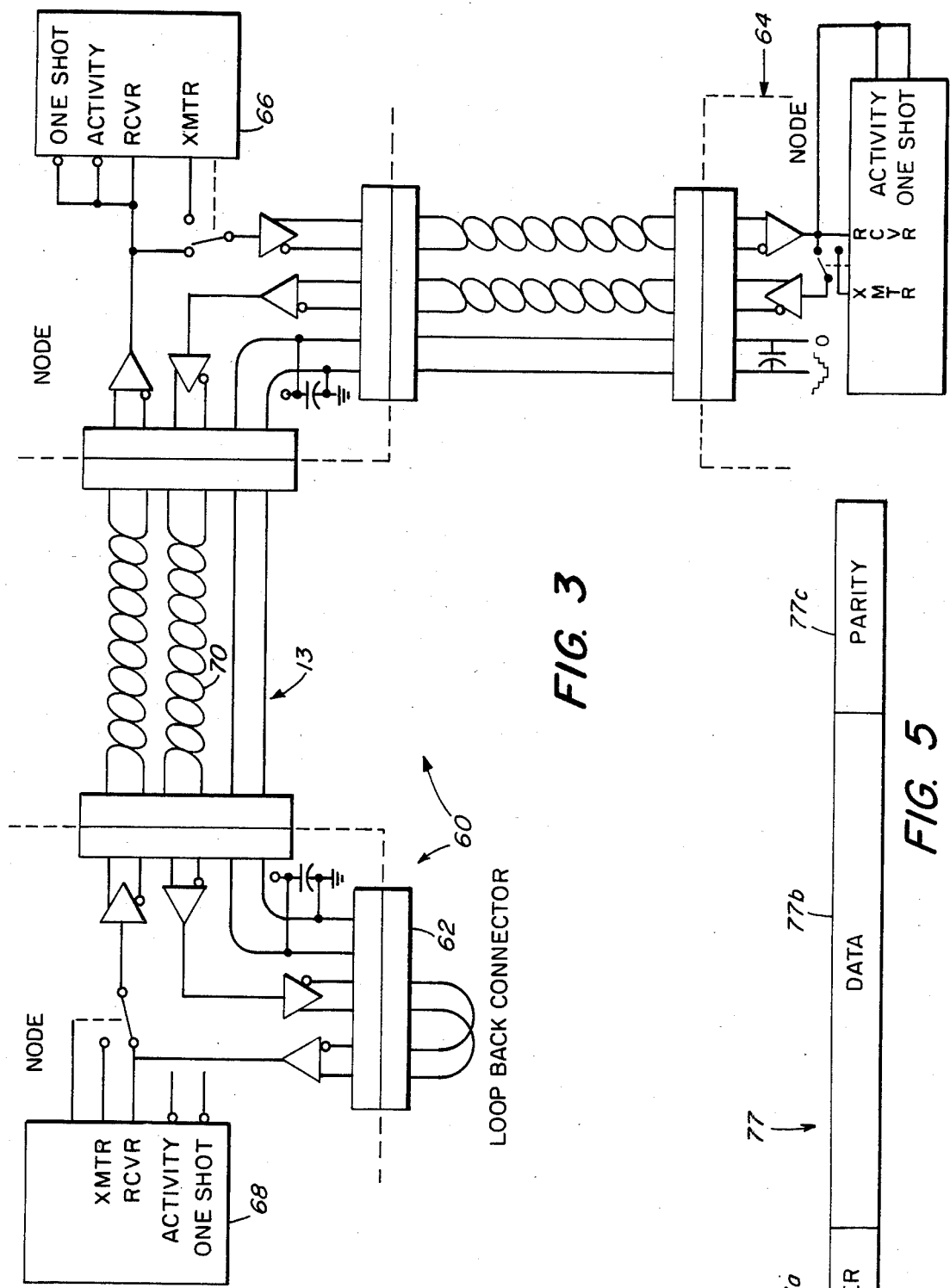
FIG. 3 is a more detailed block diagram schematic of a double line ring bus employing the invention.

Referring now to FIG. 2, each node 12 of the single loop, line ring bus illustrated there has a transceiver with a receiving line driver circuitry 14 and a transmitting line driver circuitry 16. The receiving circuitry 14 and transmitting circuitry 16 are connected to a switching circuit 18 illustrated as a single pole, double throw switch. When the node is not able to transmit or does not have a data packet ready for transmission, the transceiver is connected through the switching circuitry to operate as a repeater station. The switching circuitry 18 is under the control of a control circuitry 20 and the control circuitry 20 is responsive to and monitors the output of the receiving line driver circuitry 14 for controlling the operation of the node according to an established node protocol as described below.

Figure 4:
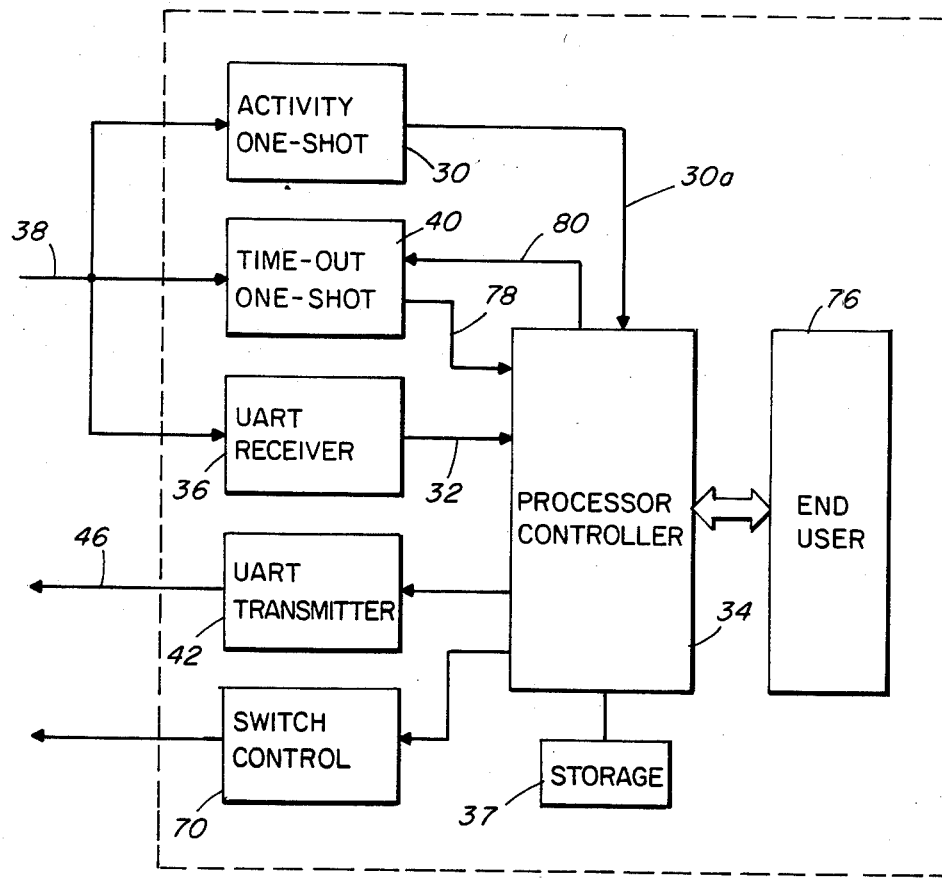
FIG. 4 is a detailed schematic diagram of a network node controller in accordance with the invention.

In typical operation, the switching circuitry 18 connects, as shown in FIG. 2, the receiving circuitry 14 to the transmitting circuitry 16. While the node is acting as a repeater station in this pass through mode of operation, the control circuitry 20 is monitoring the incoming data stream, if any, for message activity. Referring also to FIG. 4, activity on the network bus, for example, a negative transition on the bus (an activity detecting one-shot 30 with appropriate filtering (noise rejection) to avoid false triggering due to interference on the network, can be employed as an activity detector), provides an interrupt signal over a line 30a to a control processor circuitry 34. The control processor circuitry 34 in response to the interrupt stores the incoming data, available to it over a line 32 from a UART receiver circuitry 36, in a buffer 37. The UART receiver circuitry 36 forms part of the transceiver. Other transceiver systems such as USART, Bi-Phase, etc. can be employed. The UART receiver circuitry receives its input from receiving line driver circuitry 14 over a line 38. The controller circuitry 20 determines whether the data is intended for the particular node. At the same time, the data continues to pass through the node, through the transmitting line driver circuitry 16 for transmission to the next node along the communications path.

Simultaneous with the receipt and storage of message data over line 38, control circuitry 20 responds to incoming activity by restarting, for each negative transition, a time-out circuitry 40. In this preferred embodiment of the invention, the time-out circuitry 40 is a retriggerable one-shot element which is programmable by processor circuitry 34 of control circuitry 20. In the illustrated embodiment, the retriggerable time-out one-shot 40 will have two selectable time-out durations, the time-out durations being set and selected as described below and receives its input signal from activity detector 30.

When a node 12 has data to transmit along the network, the data is assembled and formatted into a data packet by the processor 34. The data packet is transmitted over the network immediately if there is no activity on the network and if time-out one-shot 40 has provided a signal, after activity ceases, indicating the end of the programmed time-out duration. Thus, after the time-out duration has ended, the control circuitry 20 actuates switching circuitry 18 to a state in which the node acquires the bus, and transmits locally generated data as a data packet along the network. A UART transmitter 42 is employed to take the digital data from the processor 34 and to apply it over a line 46 to switching circuitry 18 and thence to transmitting line driver circuitry 16.

Since the network has a loop topology, meaning that a message sent from one node will follow a path through each other node of the network and return to the node from which it was transmitted, the transmitting node can and does check the integrity of the network by matching the returning data packet with the data that it transmitted. So long as the received data matches that which was transmitted by the node, data transmission continues to its natural termination. In this manner, a destination node need not acknowledge receipt of the data. The transmitting node, by its receipt of the data, is assured that the data was not so degraded as to be unreadable at some earlier node in the "chain" of nodes. That is, the transmitting node receives the most corrupted form of the transmitted data packet.

If, at some point during the transmission, an error or mismatch occurs between the received and transmitted data, the transmitted data packet will be truncated, that is, in the illustrated embodiment, immediately terminated, and a bad message signal or marker will be added at the end of the truncated data packet. In the illustrated embodiment, the bad message marker is formed by providing the message with a unique universally recognized word having a parity error therein. The transmitting station will continue to send the bad message marker until it recognizes receipt of the marker at its receiver.

Upon receipt of the bad message marker, transmission from the local source terminates and the state of the switching circuitry 18 is returned to the "pass through" or monitor mode of operation. According to this operating protocol, transmission from the transmitting node, as well as all other nodes, will then be inhibited for the time-out duration, the end of which is marked by a signal from the time-out one-shot 40. In the illustrated embodiment, the time-out duration is a relatively long duration, for example the equivalent of two message words. At the end of the time-out duration, the transmitting node can again access the bus, assuming it is free, and begin a new transmission of its data packet.

BUS CONTENTION PROTOCOL

It can occur that the mismatch referred to above was the result of two or more network nodes simultaneously seeking to acquire the bus. This is a bus contention condition, and the data received by a transmitting node will differ from the data transmitted by the node beginning at the first received data word.

According to the invention, a bus contention protocol enables the node having the highest priority message to transmit first. In accordance with the protocol, each transmitting node first "backs off", terminating its transmission, and refrains from attempting to retransmit on the network for a time-out duration determined by the protocol.

It will be recalled that a time-out duration is set by a programmable one-shot 40. Two "programmed" time durations are employed, a short duration of approximately one and one-half message words, and a long duration of approximately two message words as noted above. All nodes have the same short and long time-out durations. The particular time-out duration programmed by a node's processor 34 depends upon the priorty of the message being sent by the node relative to the priority of the message being received by the node. Thus, if the message being sent has a higher priority than the message being received, the node will select and program the short time-out duration during which it will not transmit. On the other hand, if the node receives a message having a higher priority than the message being transmitted by the node, the long time-out duration will be selected and programmed. Thus, a node having a higher priority message can initiate retransmission at a time prior to that of a node having a lower priority message. Thus, during a bus contention situation between two messages, the higher priority message will be transmitted first and the lower priority message thereafter.

It can occur also that more than two nodes simultaneously seek to acquire the bus. In this situation, after the initial transmission by all nodes, up to all but one of the nodes can consider themselves to be "higher priority nodes" and can thus seek to reacquire the bus, simultaneously, after the first short "back off" period. The protocol according to the illustrated embodiment, provides for this more complex contention condition. After the first short time-out period, the remaining contending higher priority nodes will simultaneously seek to acquire the bus and will transmit their respective message data packets a second time, monitor the returning signals, and thereafter determine if a contention situation still exists, and if so, which node (message) has the higher priority. If a contention situation then exists, all contending nodes "back off" again, however as before, the nodes having a lower priority message "back off" a longer time-out duration. A bus contention situation will be satisfactorily resolved when only one node, the node with the highest priority message, seeks to acquire and transmit on the bus. If "n" nodes attempt to simultaneously acquire the bus, the protocol can require, in the worse case, "n−1" back-off procedures before the highest priority node has sole access to the bus. The protocol thus ensures that the most urgent message, the highest priority message, will be transmitted first, while the lower priority messages will be handled thereafter.

In the special case that two nodes begin transmission at the same time, with messages of different length (but identical insofar as the shorter message is the same as that portion of the longer message equal to the shorter message), it is the function of controller 34 of the short message node to actuate the bus switch to a pass-through position immediately after verifying transmission of the last byte of its message stream. Thereby, the longer message will be permitted to continue in an uninterrupted manner so that the node transmitting that longer message is unawae of the possible node contention situation. In this case case, the node with the shorter message will treat the network access attempt in a manner identical to an attempt to transmit on a previously busy bus; and in accordance with this procedure, the priority contention resolution between nodes will not be visible outside of the node which attempted to transmit the shorter message.

In the illustrated embodiment, the minimum time difference between the long and short one-shot delay time durations must be greater than or equal to one clock cycle of the digital counter employed in the digital retriggerable one-shot 40, plus the worse case control logic propogation delays in the system, plus the network bus propagation delay. Furthermore, since two one-shot time-out periods are employed around the bus, it is desirable that they both "time out" before an actual bus acquisition attempt is begun. Therefore, at each node, a second time-out delay is added to the long or the short one-shot time-out delay to permit nodes having the long one-shot time-out period to successfully time-out before a new bus acquisition attempt is made. The minimum delay required is equal to the maximum time difference between the long and short one-shot periods. All nodes employ this additional delay regardless of the priority of their message.

It is furthermore desirable, depending upon the user needs, that a delay between actuating the bus switch to the local source transmit state and actually transmitting on the bus (which activates the activity detectors of the other nodes and of the transmitting node as well), be specified so that in a contention situation all of the higher priority nodes (those nodes programming a short line-out duration) are guaranteed contention and will not be denied access to the bus on the basis of random timing of the propagation delays or of clock synchronization. This delay should be less than half the difference between the long and short time-out durations, but longer than the sum of all of the worse case propagation delays.

It is further possible by judicious utilization of the one-shot 40 to permit a node to mask off its serial data receiver for the length of a message which the node does not require or need. This requires that the node controller have data regarding what messages it needs to know and the message format which can be used controlled. When this feature is employed (thereby not requiring the system to be dependent on the serial/parallel converter (UART) to determine message boundaries), the retriggerable one-shot 40 is loaded with the long time period and an internally generated error message marker is set so the node's end of message circuitry ignores any accumulated message. Importantly, in the illustrated embodiment, the end of message one-shot 40, by its interrupt, causes the bus mechanisms to be completely reinitialized to permit reception of following network messages and it is for this reason that the second time out delay is important.

A SECOND LOOP TOPOLOGY

Referring now to FIG. 3, the loop topology can have the structure of a double line ring bus 60. The illustrated bus is terminated at one end with a loop back connector 62 and at the other end by the normal operation of a node 64. The connection configuration of node 64 could have been employed at the other end of the bus, and thus there is clearly no requirement that a loop back connector be used. Similarly a loop back connector could have been employed at node 64. The operation of the double line ring bus is identical to the single loop line ring bus of FIG. 2. Each node 64, 66, 68 operates in the same manner as nodes 12 of the illustrated embodiment of FIG. 2. A return line 70, a twisted wire pair in the illustrated embodiment, connects and completes the loop structure between the ends of the otherwise open single line bus.

TYPICAL OPERATION

Figure 5:
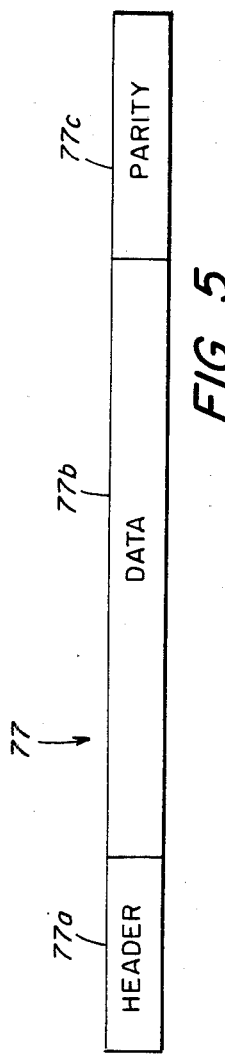
FIG. 5 is a representation of a typical data packet according to the invention.

As noted above, and referring to FIG. 4, each node illustrated has an activity one-shot 30, a programmable, retriggerable time-out one-shot 40, a UART receiver 36, a UART transmitter 42, a processor 34, and a storage media 37. In addition, a switching control circuitry 70 is provided and operates in response to the processor 34 for controlling the switching circuitry 18. In a preferred embodiment, the processor 34 is a microprocessor based circuit which has been programmed for receiving and transmitting data through the UART receiver and transmitter respectively, and for receiving the outputs of the activity detector 30 and the time-out one-shot 40 as interrupts as are standardly used in the computer arts. Thus, the processor 34, in response to an interrupt from the activity detector 30 over line 30a, determines that activity has begun to take place on the network. Switching circuitry 18 is in the pass through or monitor state at this time. The processor 34 receives data from the UART receiver 36 over line 32 and stores the received data in the buffer memory 37. The processor then examines, in this illustrated embodiment, the "header" data that is, typically the first byte of the message (see FIG. 5) to determine the message priority and other information. (In other embodiments, the first message byte(s), while generally most significant for determining message priorities, are designated in a format determined by the transmitting node.) The message is, as noted above, passed through to the downstream side of the channel from the node because the processor 34 has previously enabled the switching control circuitry 70 to operate switching circuitry 18 in the pass through state.

Typically, an end user 76 will have data to place on the network. The processor 34 collects that data and forms a data packet 77 (FIG. 5), the data packet having a priority determining header portion 77a, which in the illustrated embodiment is (are) the first byte(s) of the message, a data portion 77b of the message, and a parity trailing portion 77c. The header is predetermined in the transmitter's "look-up table" and identifies, for example, the source of the data, its priority, and the destination of the data. If necessary more than one byte can be used for the header in those instances where a single byte is not adequate. The data portion represents the end user data and the parity portion completes the message and, upon receipt, ensures the integrity of the message. Each data byte also has its own parity check. Thus error check bits are distributed throughout the message.

Once the data packet is assembled by processor 34, the processor waits until (a) there is no activity on the line and (b) the time-out one-shot 40 provides an interrupt over a line 78. Thus, an interrupt over line 78, after the interrupt over line 72 (indicating network activity), provides sufficient information to the processor 34 to enable it to determine that the network is not being used and that the processor 34 can initiate data transmission over the network. The processor 34 then forces the switching circuitry 18, through switch control circuitry 70, to the local source transmit state and provides, through the UART transmitter 42, the data packet to be sent. As the data is transmitted over line 46 to line driver 16 and then to the network, the processor 34 coincidentally receives the data on the upstream side of the channel. This data should be the transmitted data after it has traversed the entire network "loop". The received data is compared with or matched to the transmitted data by the processor 34; and so long as identity of data is maintained, transmission of the data packet proceeds to a natural conclusion and termination. If however there is an error in the received data, the transmission of data is truncated, immediately terminated in the illustrated embodiment, and a bad message error word is sent. The bad message error word is a unique word, universal for all nodes, (in the illustrated embodiment it is a special ABORT character which has incorrect parity), and is predetermined in the transmitting node processor's look-up table.

In the illustrated embodiment, for ease of implementation, if the error is in the first byte of the received message, a bus contention situation has arisen. Processor 34 recognizes the first byte of a data packet as a "special" byte; and upon the determination that a priority contention situation exists, the processor 34 truncates its message prematurely and waits for a time-out interrupt from time-out one-shot 40 over line 78. Similarly, all other transmitting nodes recognize the existence of a bus contention situation and terminate data transmission until the occurrence of the time-out interrupt from time-out one-shot 40. The processor 34 however also compares the priority of the message being received on the upstream side of the network with the priority of its own message, and as a result, programs the one-shot 40 to either a short or long time-out duration as noted above. Thus, if the priority of the message being transmitted by processor 34 is higher (that is, more urgent) than the incoming message, a short time-out duration is employed. (For example, a simple arithmetic comparison of the "first bytes" can be made, with message priority corresponding to the first byte transmitted arithmetic value.) The processor 34 programs the one-shot 40 over a line 80 and, at the end of the programmed time duration as identified by the interrupt over line 78, and the further delays noted above, attempts to retransmit its data packet. However, if the node had a lower priority, the processor 34 would have programmed a long time-out delay over line 80 into one-shot 40, and the node would have been inhibited from transmitting its data packet after the time-out interrupt over line 78 because activity would have previously occurred on the network. This earlier activity maintains the processor in a "backed off" state, inhibited from transmitting, until the activity on the network ceases and an interrupt thereafter occurs on line 78.

In this manner, the bus contention "protocol" described above in implemented in a highly reliable, low overhead hardware system.

Additions, subtractions, deletions, and other modifications of the illustrated embodiments will occur to those practiced in the art and are within the scope of the following claims.

What is claimed is:

1. In a data communications network having a transmission data channel with a plurality of network nodes connected thereto according to a loop topology, connection apparatus at each network node comprising:
    a transceiver means having
        an upstream receiver means for receiving message data on an upstream side of said data channel at said network node, and
        a downstream transmitting means for applying message data to the downstream side of said data channel at said network node,
    switching means operable
        in a pass through state for effectively connecting said upstream receiving means and said downstream transmitting means for applying the message data received on said upstream side of said data channel to the downstream side of said data channel, and
        in a source transmit state for connecting a local source of message data to said downstream transmitting means for applying local message data to said downstream side of said data channel, and
    means for controlling the operating state of said switching means, said controlling means comprising
        means responsive to received message data when said switching means is in said pass through state for maintaining said switching means in said pass through state,
        means responsive to said local source for actuating said switching means from said pass through state to said local source transmit state when no message data is being received from said upstream side of said channel at the time of actuation, and
        means for comparing upstream received message data with said transmitted message data when said switching means is in said transmit state, and for terminating local transmission and thereafter actuating said switching means to said pass through state, if the received data is not identical to the transmitted data,
    wherein said controlling means further comprises
        means responsive to said comparing and terminating means for repeatedly applying to said downstream channel a unique bad message marker, and
        said comparing and terminated means terminating local transmission after receipt of said bad message marker by said node.

2. In a data communications network having a transmission data channel with a plurality of network nodes connected thereto according to a loop topology, connection apparatus at each network node comprising:
    a transceiver means having
        an upstream receiver means for receiving message data on an upstream side of said data channel at said network node, and
        a downstream transmitting means for applying message data to the downstream side of said data channel at said network node,
    switching means operable
        in a pass through state for effectively connecting said upstream receiving means and said downstream transmitting means for applying the message data received on said upstream side of said data channel to the downstream side of said data channel, and
        in a source transmit state for connecting a local source of message data to said downstream transmitting means for applying local message data to said downstream side of said data channel, and
    means for controlling the operating state of said switching means said controlling means comprising
        means responsive to received message data when said switching means is in said pass through state for maintaining said switching means in said pass through state,
        means responsive to said local source for actuating said switching means from said pass through state to said local source transmit state when no message data is being received from said upstream side of said channel at the time of actuation, and
        means for comparing upstream received message data with said transmitted message data when said switching means is in said transmit state, and for terminating local transmission and thereafter actuating said switching means to said pass through state, if the received data is not identical to the transmitted data,
    wherein said controlling means further comprises
    timing means for production a time-out signal, and
    means responsive to received message data for initiating at each received data, the timing of a selected one of at least two time out durations, said time-out signal representing the end of a said selected duration, and
    means responsive to said timing means for inhibiting transmission of local message data during said selected duration,
    wherein said controlling means further comprises
    means for determining an occurrence of a bus contention situation, and
    priority means responsive to said determining means for selecting a short time-out duration from said timing means when said network node has a higher priority than a contending network node upstream thereof, and for selecting a long time-out duration from said timing means when said network node has a lower priority than the contending network node upstream thereof.

3. The apparatus of claim 2 wherein said controlling means further comprises means responsive to said timing means for further delaying said local message transmission after occurrence of said selected time-out duration until the passage of a delay time duration equal at least to the sum of
(a) the difference between said long and short time durations;
(b) the maximum propagation time around the network, and
(c) the worse case logic delay for the controlling means.

4. The apparatus of claim 3 wherein said timing means comprises
a retriggerable programmable one-shot circuit responsive to said priority means for providing a signal output having a pulse duration selected by said priority means.

5. The apparatus of claim 4 wherein said long and short time-out durations have a minimum difference equal to the sum of
(a) one clock cycle of a digital counter of said retriggerable one-shot,
(b) worse case controlling means logic propogation delays, and
(c) network bus propagation delay.

6. The apparatus of claim 4 wherein said local source comprises means for assembling said network message data so that a first word thereof represents the priority of the message source.

7. The apparatus of claim 6 wherein said assembling means further comprises
means for forcing a parity error in said message for marking said message as a bad message wherein the data is to be ignored.

8. In a data communications network having a transmission data channel with a plurlity of network nodes connected thereto according to a loop topology, apparatus at each network node comprising
a transceiver having
an upstream receiver for receiving message data on an upstream side of the data channel at the network node, and
a downstream transmitter for applying message data to the downsteam side of the data channel at the network node,
switching means operable
in a pass through state for effectively connecting said receiver and transmitter for applying the message data received on the upstream side of the data channel to the downstream side of the data channel, and
in a source transmit state for connecting a local source of message data to the downstream side of the data channel,
said local source comprising means for assembling the network message data so that a first word thereof represents the priority of the message source, and
means for controlling the operating state of the switching means, said controlling means comprising
means responsive to the received message data when the switching means is in the pass through state for maintaining the switching means in the pass through state,
means responsive to the local source for actuating the switching means for the pass through state to the local source transmit state when no message data is being received from the upstream side of the channel at the time of actuation,
means for comparing upstream received message data with transmitted message data when the switching means is in the transmit state, and for terminating local transmission and thereafter actuating said switching means to said pass through state if the received data does not match the transmitted data, said assembling means further comprising means for forcing a parity error in said message for marking said message as a bad message wherein the data is ignored by a destination node and the message terminated,
means for determining an occurrence of a bus contention situation,
priority means responsive to the determining means for selecting a short time-out duration from a timing means when said network node has a higher priority than a contending network node upstream thereof, and for selecting a long time-out duration from the timing means when the network node has a lower priority than the contending network node upstream thereof,
said timing means being a retriggerable, programmable one-shot circuit responsive to said priority means for providing signal output representing the time duration selected by said priority means, and
means responsive to said timing means for inhibiting transmission of local message data during said selected duration.

9. A method for communicating between a plurality of network nodes sequentially connected along a communications transmission channel, said channel providing a loop data path communications structure, said method comprising, at each network node, the steps of
receiving message data on the upstream side of said data channel,
transmitting message data on the downstream side of said data channel from a selected source,
selecting said source by switching between said upstream side a said data channel and a network node local source of message data, said upstream side of said data channel providing the channel message data and the network node local source providing local message data for said channel,
controlling which source to select for transmission downstream by
responding to the received message data when the upstream side of said data channel is selected for maintaining the upstream data channel as the selected source,
selecting the local source of message data when the network node has a data packet ready to transmit data so long as no message data is being received upstream of the network location at the time of selecting the local source,
terminating local transmission in response to a mismatch of received and transmitted data, and
selecting the pass through mode of operation after said terminating step when the upstream received message data and the transmitted message data are different,
further comprising the step of
inhibiting transmission of message data from said local source until after the termination of a selected time-out duration, said time out duration being a selected time duration beginning after the last to be received of the incoming received message data, further comprising the steps determining an occurrence of a bus contention situation, selecting a short time-out duration after which to transmit source message data when the network node has a higher priority than the contending network node upstream thereof, and selecting a long time-out duration when the network node has a lower priority than the contending network node upstream thereof.

10. The method of claim 9 further comprising the step of further inhibiting transmission of message data after said time-out duration for a delay duration at least equal to the maximum difference between said long and short time-out durations.

11. The method of claim 9 further comprising the step of selecting the difference of said short and long time durations equal at least to the sum of:
(a) one clock cycle of a digital counter of said retriggerable one-shot,
(b) worse case controlling means logic propagation delays, and
(c) network bus propagation delay.

12. The method of claim 10 further comprising the steps of assembling the network message data so that the first word thereof represents the priority of the message source, and forcing a parity error in said message data for marking a message to be ignored.

* * * * *